(12) United States Patent
Nhep et al.

(10) Patent No.: US 6,594,857 B2
(45) Date of Patent: Jul. 22, 2003

(54) HINGE CLIP AND COVER FOR TELECOMMUNICATIONS EQUIPMENT

(75) Inventors: Ponharith Nhep, Savage, MN (US); Douglas G. Elliot, Waconia, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 47 days.

(21) Appl. No.: 09/764,479

(22) Filed: Jan. 17, 2001

(65) Prior Publication Data

US 2002/0092127 A1 Jul. 18, 2002

(51) Int. Cl.$^7$ .................................................. E05D 7/10
(52) U.S. Cl. .............................. 16/232; 16/257; 16/261; 16/268; 49/192; 49/193; 49/381; 49/382
(58) Field of Search .......................... 16/221, 232, 257, 16/261, 268; 174/50; 49/192–193, 381–382

(56) References Cited

U.S. PATENT DOCUMENTS

| | | | | |
|---|---|---|---|---|
| 3,506,947 A | * | 4/1970 | Leskosek | 339/119 |
| 3,777,223 A | * | 12/1973 | Chandler et al. | 317/118 |
| 3,957,335 A | * | 5/1976 | Troy | 339/125 R |
| 4,773,867 A | * | 9/1988 | Keller et al. | 439/49 |
| 4,796,289 A | * | 1/1989 | Masor | 379/26 |
| 4,824,403 A | * | 4/1989 | De Luca et al. | 439/714 |
| 4,866,215 A | * | 9/1989 | Muller et al. | 174/50 |
| 5,035,645 A | * | 7/1991 | Siemon et al. | 439/532 |
| 5,144,720 A | * | 9/1992 | Aihara et al. | 16/232 |
| 5,557,828 A | * | 9/1996 | Reiner et al. | 16/257 |
| 6,321,414 B1 | * | 11/2001 | Buchanan et al. | 16/257 |

FOREIGN PATENT DOCUMENTS

| | | | | |
|---|---|---|---|---|
| DE | 4232328 A1 | * | 3/1994 | H02B/1/06 |
| EP | 0 494 496 A1 | * | 7/1992 | E05D/15/50 |
| EP | 0494496 | * | 7/1992 | E05D/15/50 |

* cited by examiner

Primary Examiner—Anthony Knight
Assistant Examiner—Lisa Bannapradist
(74) Attorney, Agent, or Firm—Merchant & Gould P.C.

(57) ABSTRACT

A hinge clip apparatus for selectively engaging/disengaging a cover includes a base, a hinge defining a hinge axis, and a plate. The plate is pivotally moveable relative to the base along the hinge which connects the base to the plate. The plate includes a hole and a spring member extending through the hole. The spring member has an extension tab capable of engaging the cover and disengaging from the cover when the spring member is compressed.

21 Claims, 14 Drawing Sheets

HINGE CLIP AND COVER FOR TELECOMMUNICATIONS EQUIPMENT

FIELD OF THE INVENTION

The present invention relates to cable management systems for telecommunications cables, and more particularly, to hinges and covers for telecommunications equipment useable in cable management systems.

BACKGROUND OF THE INVENTION

Various devices such as telecommunications frames, racks, and cabinets are used to hold and manage telecommunications equipment and the related cables. In designing cable management systems or any other communications equipment, the ease of use of the systems has become a priority. In the past, the cables are mounted within or around the frames, racks, and cabinets. The cables within or around the frames, racks, and cabinets are often exposed to dust or other unfriendly environmental conditions. Improving the dust and damage protection aspects of the frames, racks, and cabinets is also desired.

Traditionally, covers have been used to cover the frames, racks, and cabinets. However, a cover often makes cable management tasks difficult to perform due to access problems. A cover usually swings open on one side. Sometimes, an operator needs to access the system on the other side of the cover. In this case, the operator removes the cover, which is cumbersome and makes the operation very inefficient. Therefore, continued improvements are desired for the covers used in cable management systems while allowing convenient access to a system behind a cover.

SUMMARY OF THE INVENTION

One aspect of the present invention relates to a hinge clip capable of connecting a cover to a structure, such as a frame, rack, cabinet, etc. The hinge clip includes a hinge portion and a clip portion, the hinge portion being pivotally moveable relative to the clip portion along a hinge which connects the hinge portion and the clip portion, the hinge portion having a first spring section removeably retained in one of the holes of the cover, the clip portion having a second spring section snap mountable to a planar member of the structure, such as a frame, rack, cabinet, etc.

Another aspect of the present invention relates to a telecommunication cable management device including a frame defining a vertical cable pathway; a cover having first and second pairs of holes, the first pair of holes being disposed on a first side of the cover, and the second pair of holes being disposed on a second side of the cover; and first and second pairs of hinge clips, the first pair of hinge clips selectively engaging the first side of the cover with a first side of the frame, the second pair of hinge clips selectively engaging the second side of the cover with a second side of the frame.

A further aspect of the present invention relates to the hinge clip apparatus. The hinge clip includes a base; a hinge defining a hinge axis; a plate, the plate pivotally moveable relative to the base along the hinge which connects the base to the plate, the plate including a pair of holes disposed at opposite sides of an axis which is perpendicular to the hinge. The hinge clip also includes a spring member having a pair of spring arms. One end of the spring arms extend through the pair of holes, respectively, and the other end of the spring arms is connected to each other. Each of the spring arms has an extension tab capable of engaging the cover and disengaging from the cover when the spring arms are compressed.

In one aspect of the present invention, a plurality of hinge clips allow a cover to cover a vertical open frame which is capable of managing patch cords and providing cable support therein. Each of the hinge clips has a symmetrical part which allows the hinge clips to be used on either side of the cover. Accordingly, one of the advantages of the present invention is that the hinge clips allow for cable management tasks to be done without removing covers or hinge clips.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

The cable management systems of the present invention allow for management of cables in and around telecommunications equipment, frames, racks, and/or cabinets. The telecommunications cable may be fiber optic-based, copper-based, and combinations thereof. The cable management system maintains and directs cables connected to the telecommunications equipment. The hinge clips and covers of the present invention allow for protection of the telecommunications equipment, frames, racks, cabinets, and cables and access to the cable management system and components.

Figure 1:
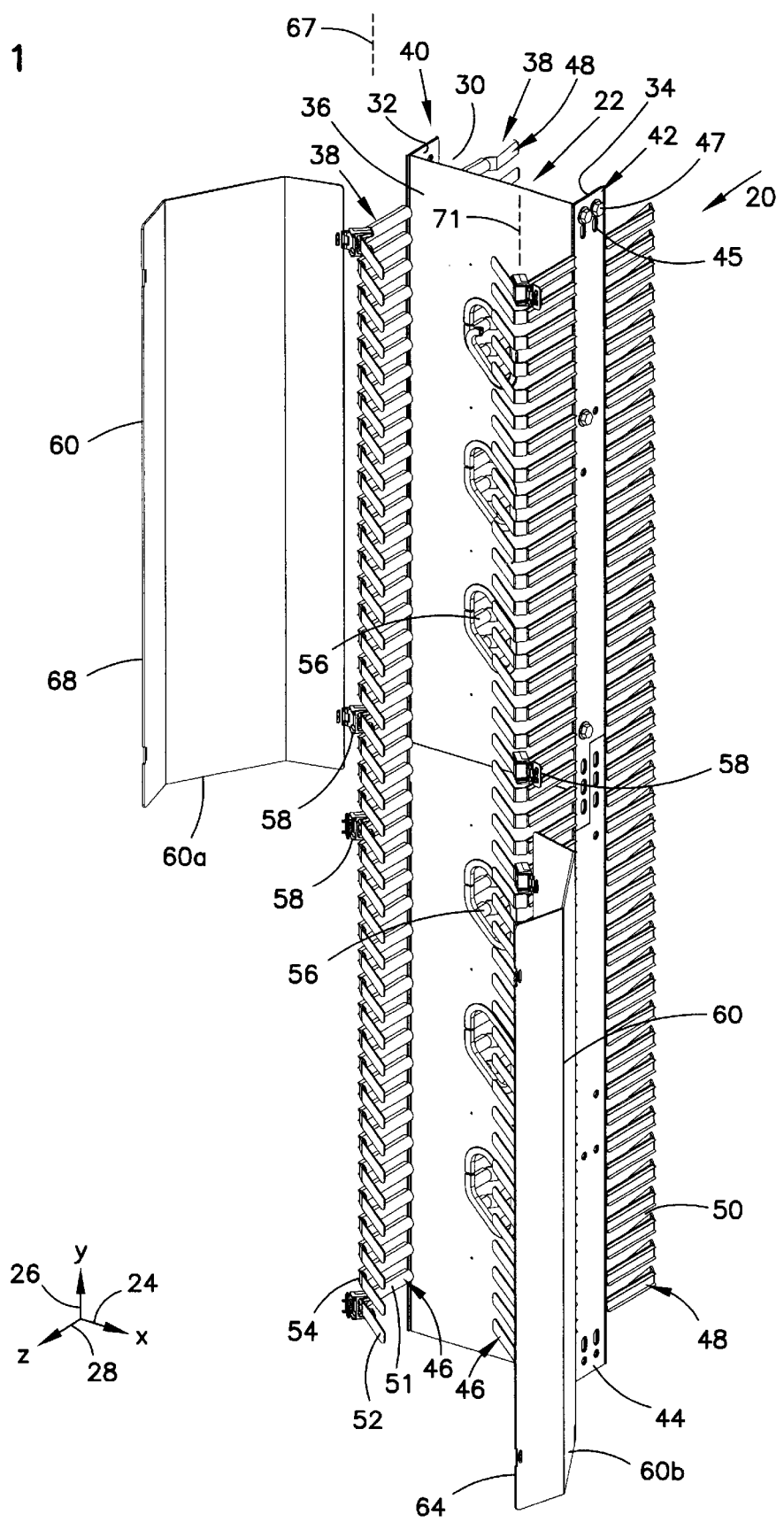
FIG. 1 is a front perspective view of one embodiment of a cable management frame including a plurality of hinge clips in accordance with the present invention, and covers being connected to the frame by the hinge clips and swung open from left and right sides.
Figure 2:
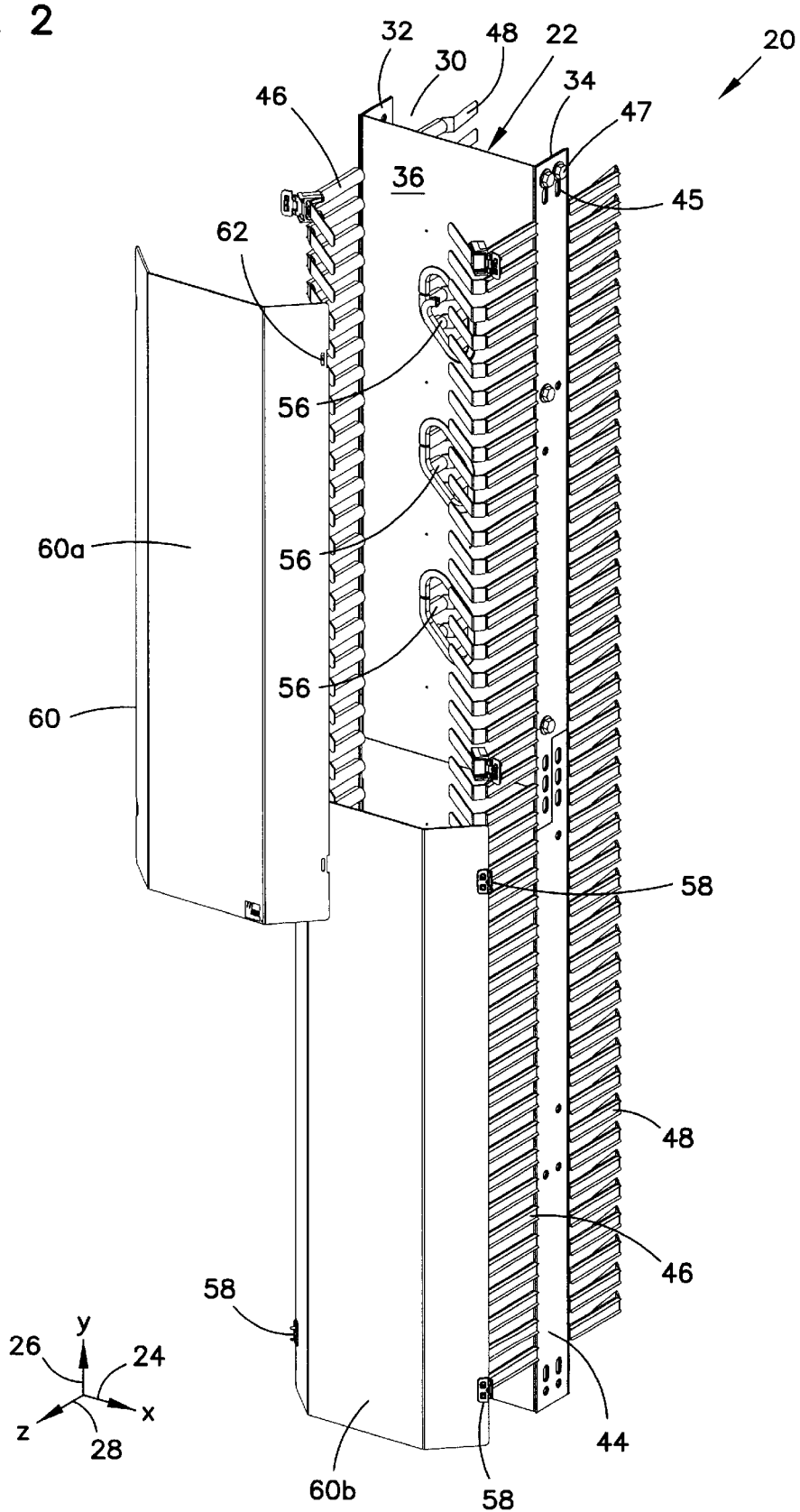
FIG. 2 is a front perspective view of the vertical cable management frame of FIG. 1 with one of the covers exploded from the frame and the other cover covering the frame.
Figure 3:
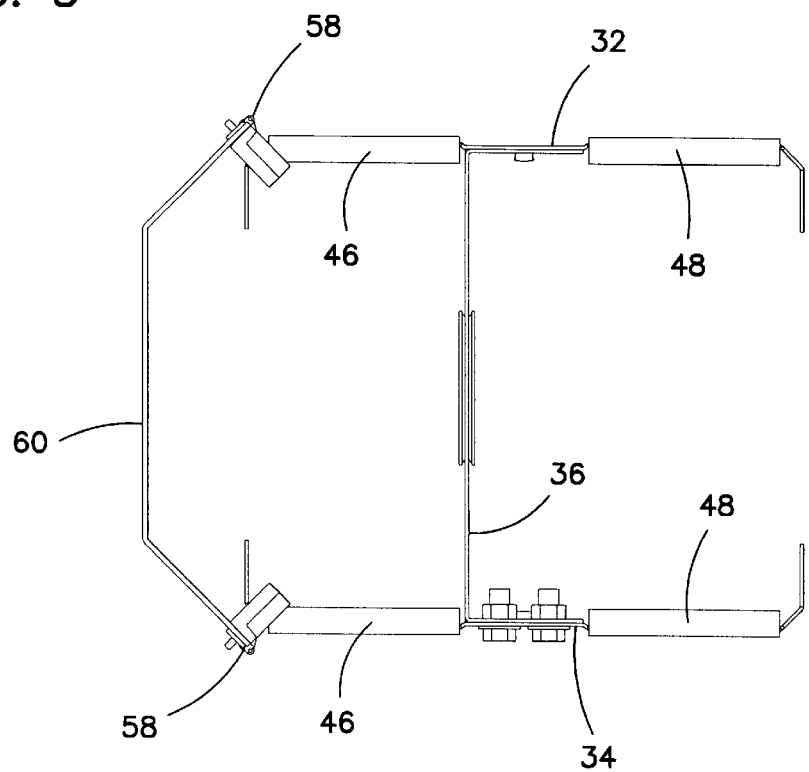
FIG. 3 is a top view of the vertical cable management frame of FIG. 1 with the covers covering the frame.

Referring now to the figures, one preferred embodiment of a cable management frame 20 is shown in FIG. 1. The cable management frame 20 is a part of a cable management system which is further described in a co-pending patent application, Ser. No. 09/228,343, filed Jan. 11, 1999, entitled "VERTICAL CABLE MANAGEMENT SYSTEM WITH RIBCAGE STRUCTURE", which is incorporated herewith by reference.

The cable management frame 20 includes a ribcage cable support member 22. The cable management frame 20 generally defines an X-axis 24, a Y-axis 26, and a Z-axis 28. The ribcage cable support member 22 includes a central U-channel 30 having two side sections 32, 34 and a middle section 36. The side sections 32, 34 and the middle section 36 extend vertically in the direction of the Y-axis 26. The front and rear of the cable management frame 20 face in the direction of the Z-axis 28. The ribcage cable support member 20 cooperates with racks (not shown) to vertically manage cables running to and from the equipment held by each rack. Typically, each cable connects to the respective piece of equipment, and the cable length travels horizontally to the nearest ribcage cable support member 20 where the cable length is supported and/or held in the desired position and directed for the distal end to be connected at another connection site.

The ribcage cable support member 22 includes two opposed columns of ribs 38 extending forwardly and rearwardly, generally in the direction of the Z-axis 26. The ribcage cable support member 22 further includes first and second sets of ribcage members 40, 42 positioned on opposite sides of the middle section 36. Each ribcage member 40, 42 includes a central spine 44, and first and second sets of ribs 46, 48 extending in opposite directions. The first set of ribs 46 extend outwardly from the spine 44 in the front. The second set of ribs 48 extend rearwardly from the spine 44 in the opposite direction. The spine 44 has a plurality of holes 45. Screws 47 connect the spine 44 onto the side sections 32, 34. Between each of the individual ribs are spaces 50 for receipt of one or more cables. Distal ends of each rib 46 include a tab 52 extending at an angle to both the rest of the rib 46, and to the direction of extension of the columns of ribs 46. A main portion 51 of each rib 46 extends in the direction of the Z-axis 28, and the tab 52 extends at an angle towards the other set of ribs in a plane defined by the X-axis 24 and the Y-axis 26. As shown in the example embodiment, the tab 52 can extend at an angle upwardly or downwardly. The rib 46 has a bent section 54 disposed between the main portion 51 of the rib 46 and the tab 52 of the rib 46.

The middle section 36 of the U-channel 30 further preferably includes a plurality of openings 56 to allow for cable to pass between a front to a rear of the ribcage cable support member 22. It is to be appreciated that any number of openings 56 can be used as desired. In addition, the positioning of the openings 56 can be varied as desired for particular cable management situations.

Referring now to FIGS. 1–7, a plurality of hinge clips 58 are disposed on the ribs 46 of the ribcage cable support member 22. One end of each hinge clip 58 is clipped onto one of the ribs 46, preferably onto the bent section 54 of the rib 46, and the other end of the hinge clip 58 is engaged with a hole 62 of covers 60a, b. As shown in FIG. 1, the top cover 60a is pivotally opened along its left side, and the bottom cover 60b is pivotally opened along its right side. The hinge clips 58 allow the covers 60a, b to open at least 180 degrees either side. The covers 60a, b are the same and will be described as the cover 60 hereafter.

In FIGS. 8–13, a preferred embodiment of the cover 60 includes a pair of the holes 62 disposed on a left side 64 which defines a left edge 66 and a pair of the holes 62 disposed on a right side 68 which defines a right edge 70. The cover 60 includes a left section 72, a middle section 74, and a right section 76. The left and right sections 72, 76 are bent inwardly from the middle section 74, which provides clearance for the ribs 46 disposed behind the cover 60.

Figure 5:
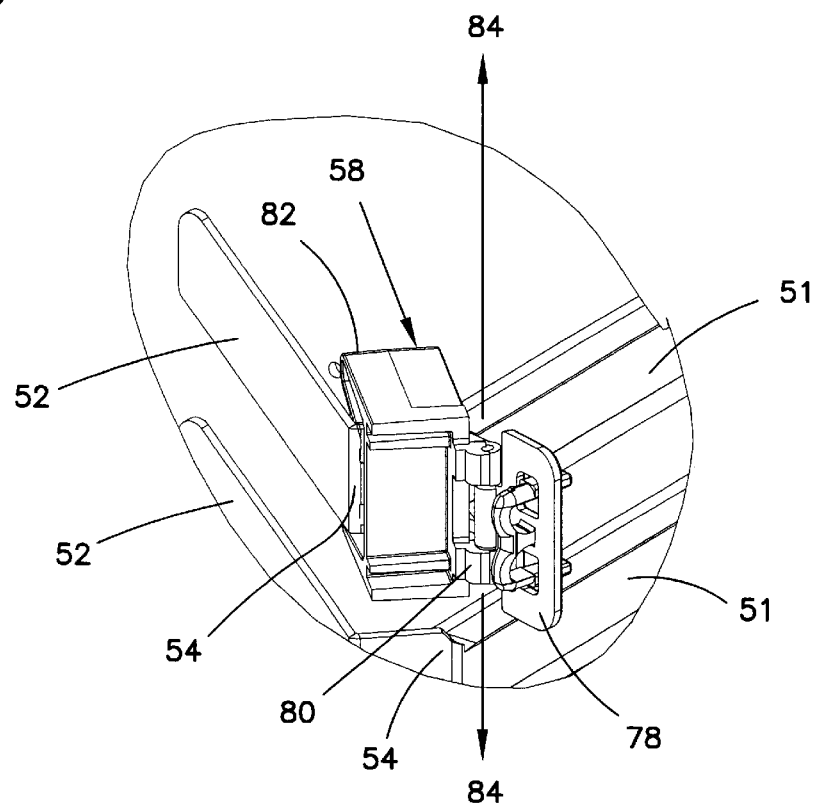
FIG. 5 is an enlarged perspective view of a hinge clip mounted on a rib at the top right corner of the vertical cable management frame of FIG. 2.
Figure 4:
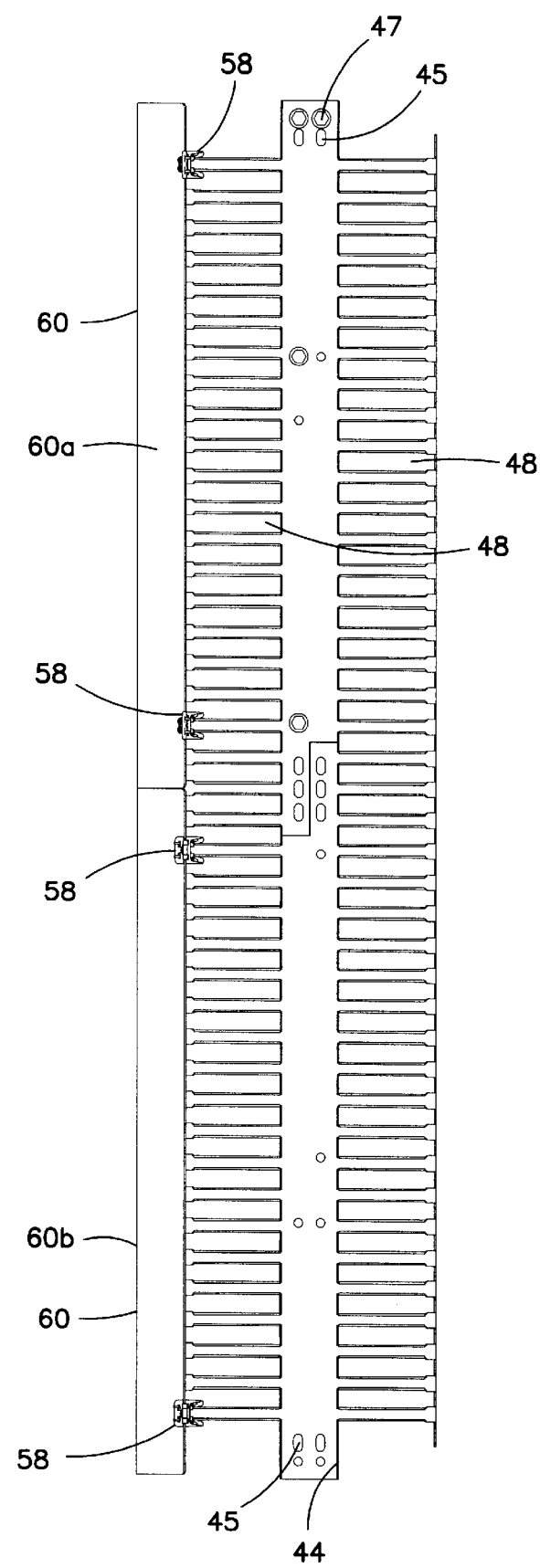
FIG. 4 is a right side view of the vertical cable management frame of FIG. 1 with the covers covering the frame.
Figure 6:
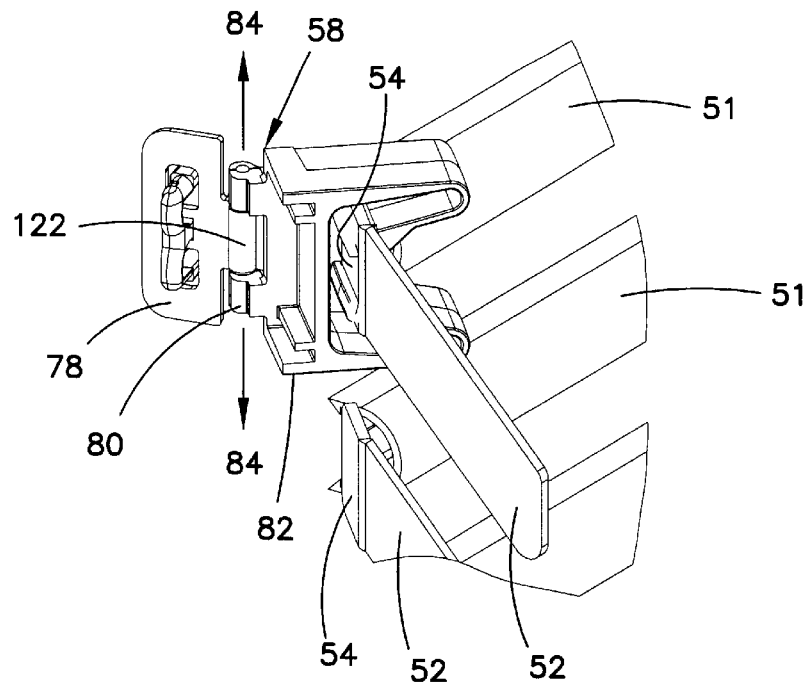
FIG. 6 is an enlarged perspective view of a hinge clip mounted on a rib at the top left corner of the vertical cable management frame of FIG. 2.
Figure 7:
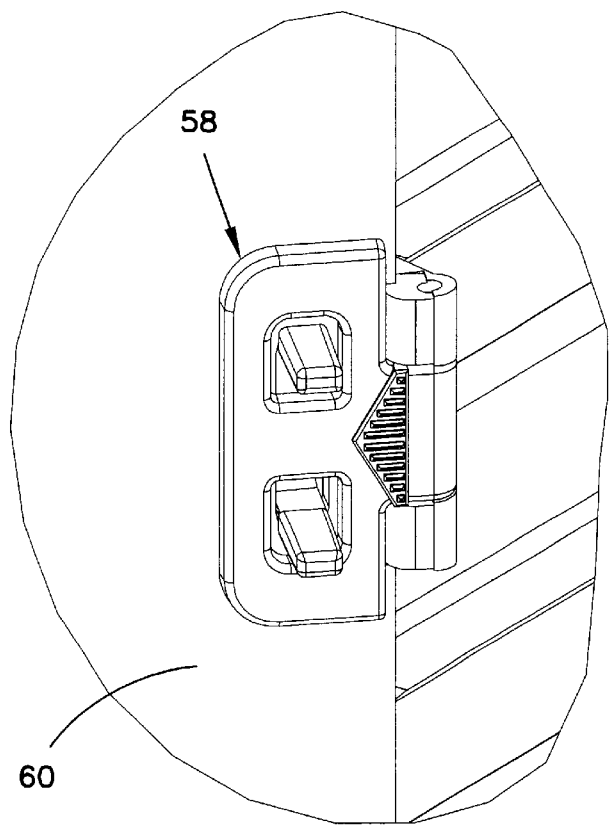
FIG. 7 is an enlarged perspective view of a hinge clip mounted between a rib and a cover that covers the vertical cable management frame of FIG. 2.
Figure 8:
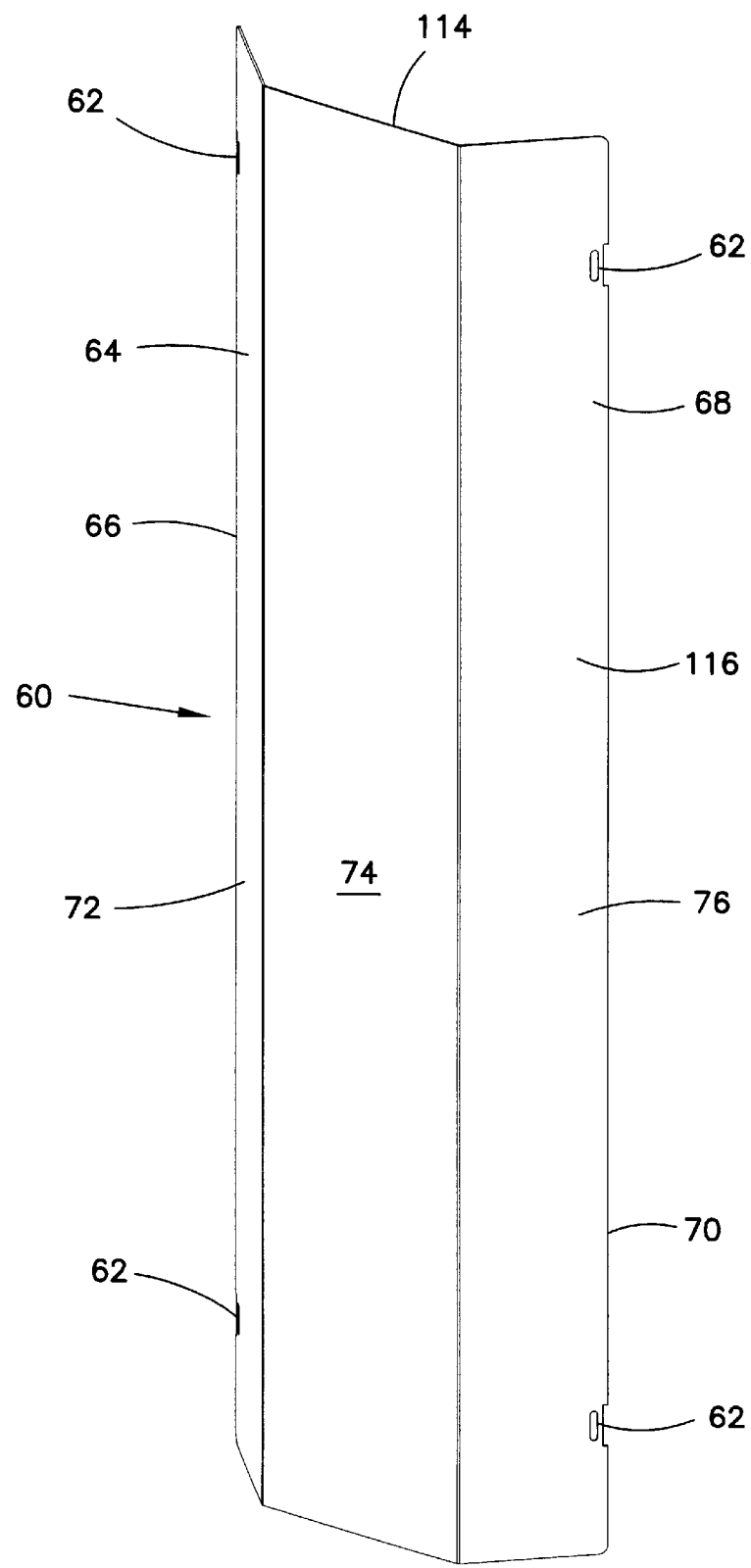
FIG. 8 is a perspective view of one of the covers of FIG. 1.
Figure 9:
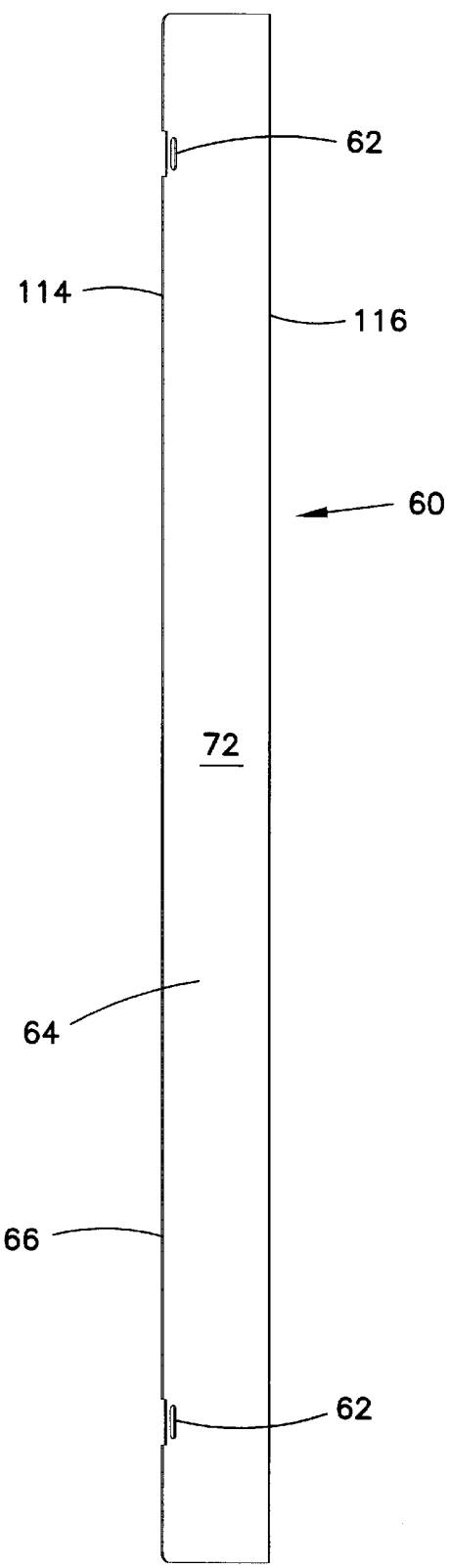
FIG. 9 is a left side view of the cover of FIG. 8.
Figure 10:
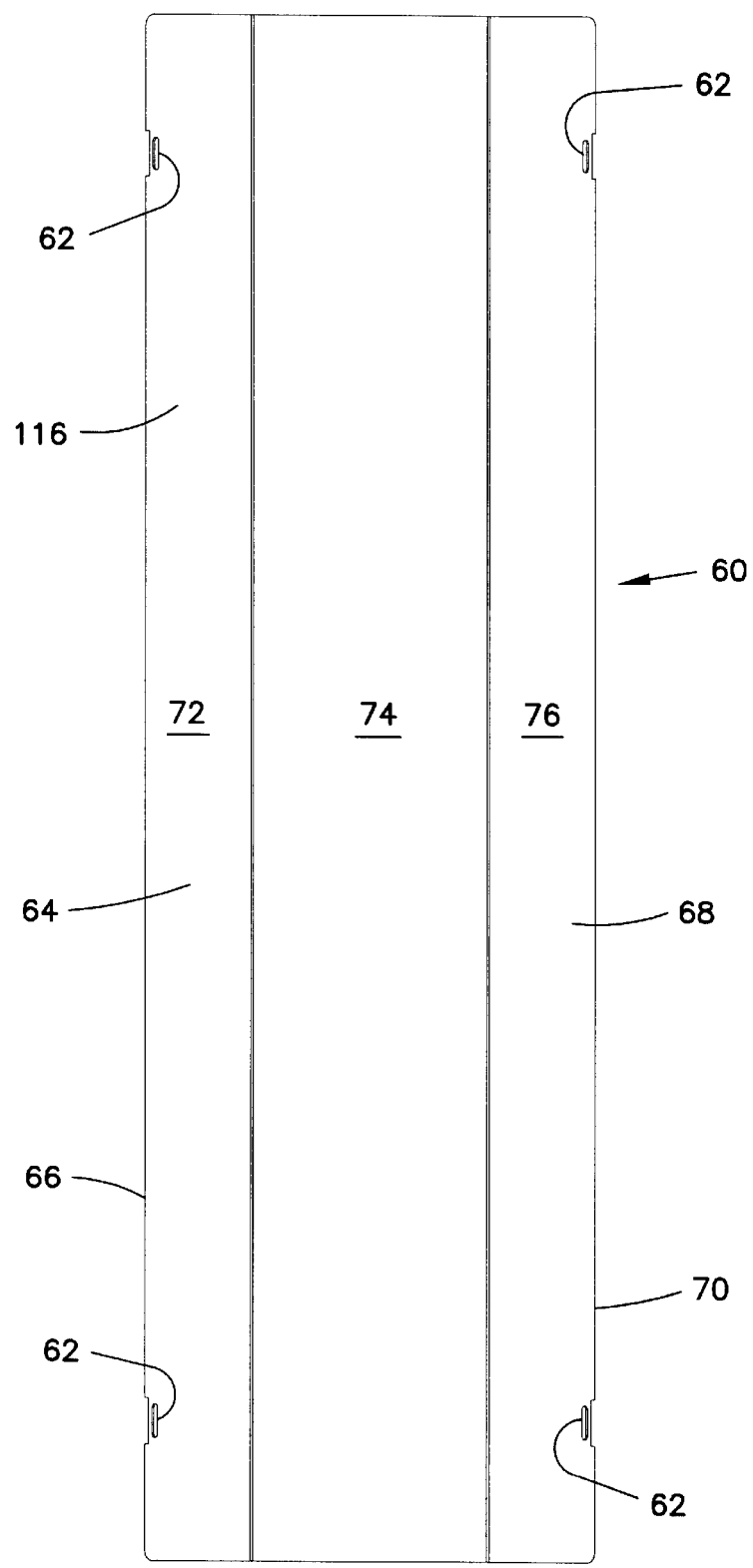
FIG. 10 is a front view of the cover of FIG. 8.
Figure 11:
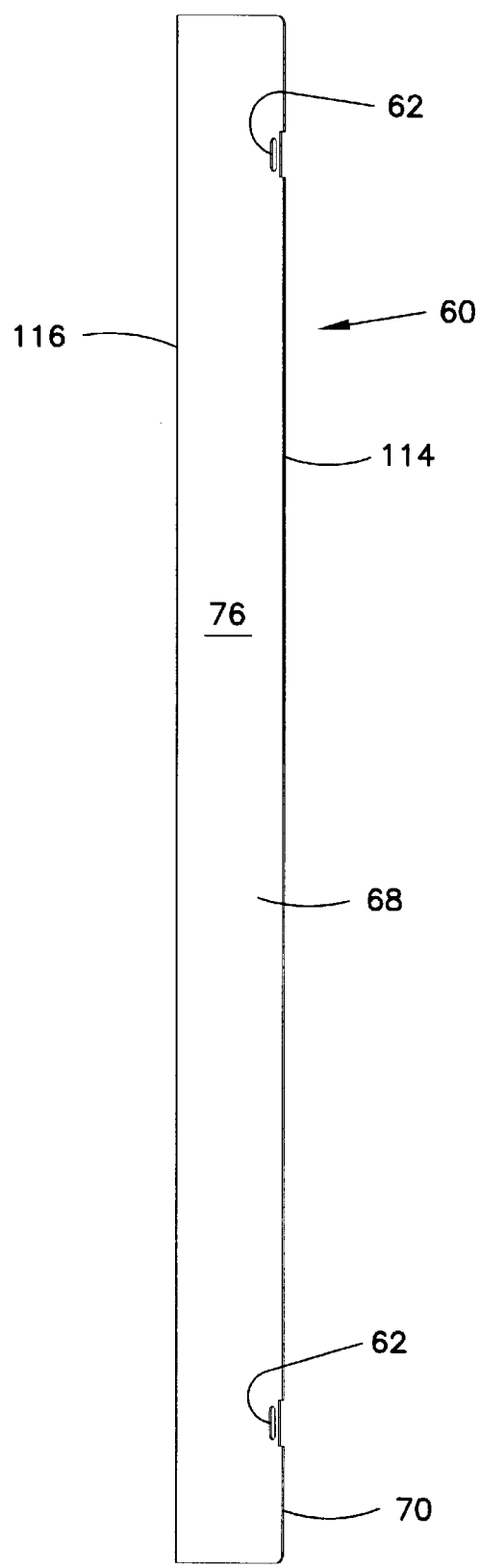
FIG. 11 is a right side view of the cover of FIG. 8.
Figure 12:
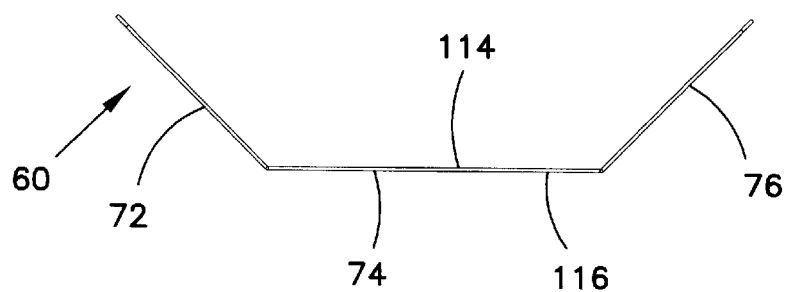
FIG. 12 is a top view of the cover of FIG. 8.
Figure 13:
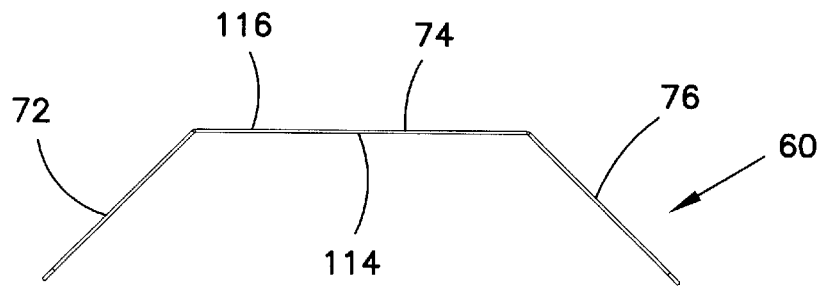
FIG. 13 is a bottom view of the cover of FIG. 8.
Figure 14:
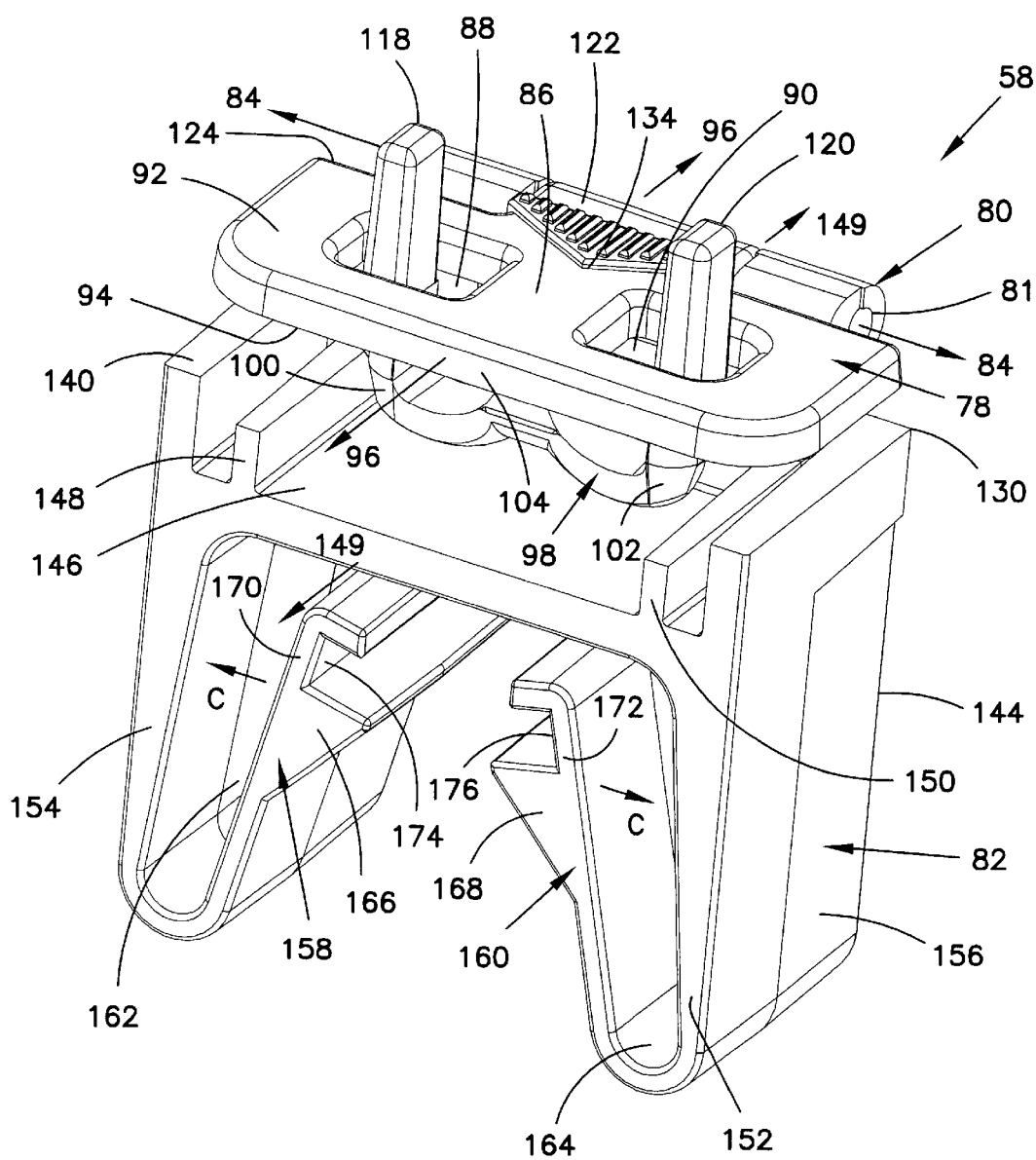
FIG. 14 is a perspective view of the hinge clip of FIG. 1.

In FIGS. 14–18, a preferred embodiment of the hinge clip 58 includes a hinge portion 78, a hinge 80, and a clip portion 82. In FIGS. 14–18, the hinge portion 78 is folded towards the clip portion 82 about a hinge axis 84 defined by the hinge 80. In FIGS. 5–6, the hinge portion 78 is unfolded from the clip portion 82 about the hinge axis 84.

The hinge portion 78 includes a plate 86 having two holes 88, 90 extending from a top side 92 of the plate 86 to a bottom side 94 of the plate 86. The two holes 88, 90 are disposed at opposite sides of an axis 96, the axis 96 being perpendicular to the hinge axis 84.

Figure 15:
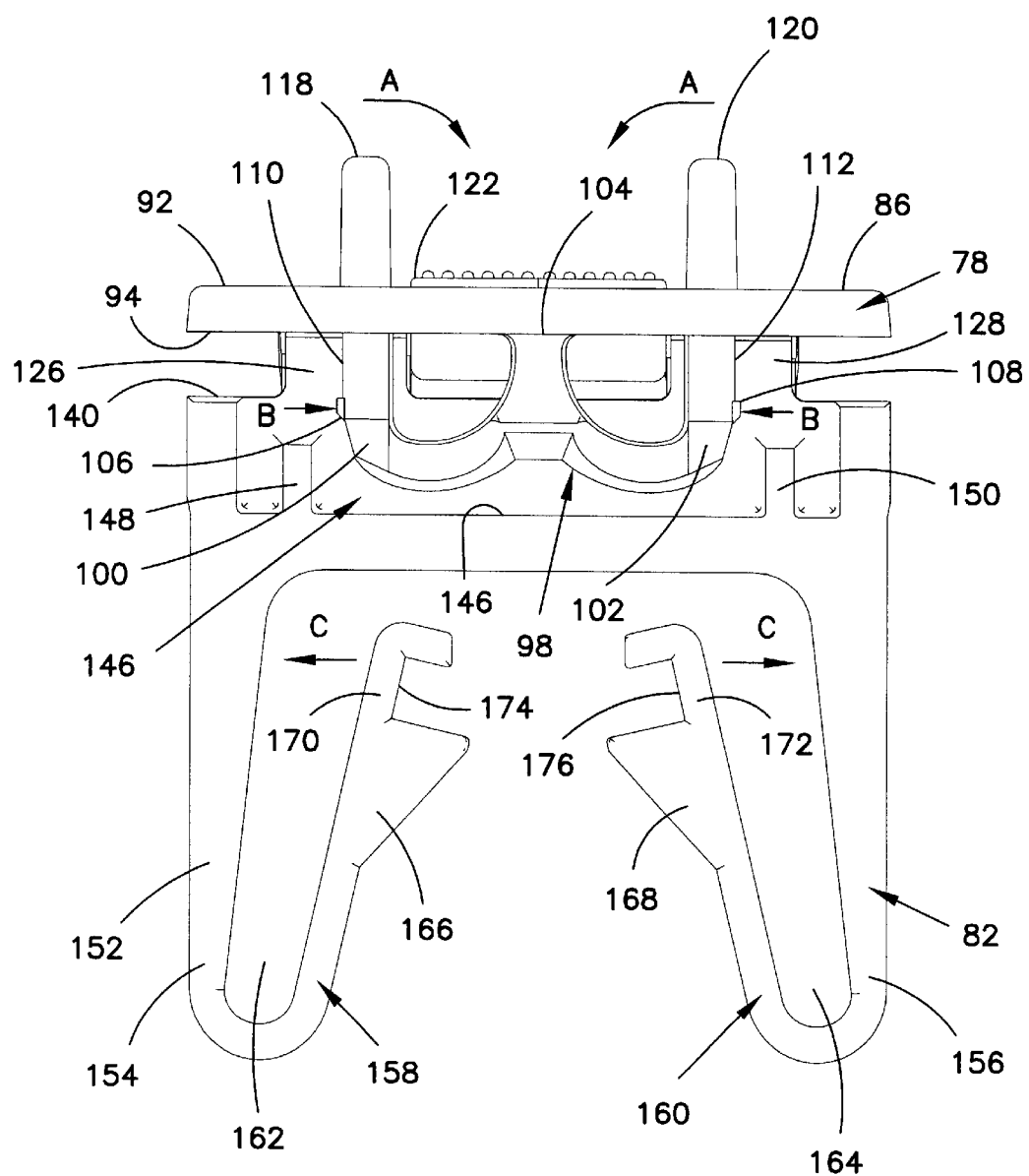
FIG. 15 is a front view of the hinge clip of FIG. 14.
Figure 16:
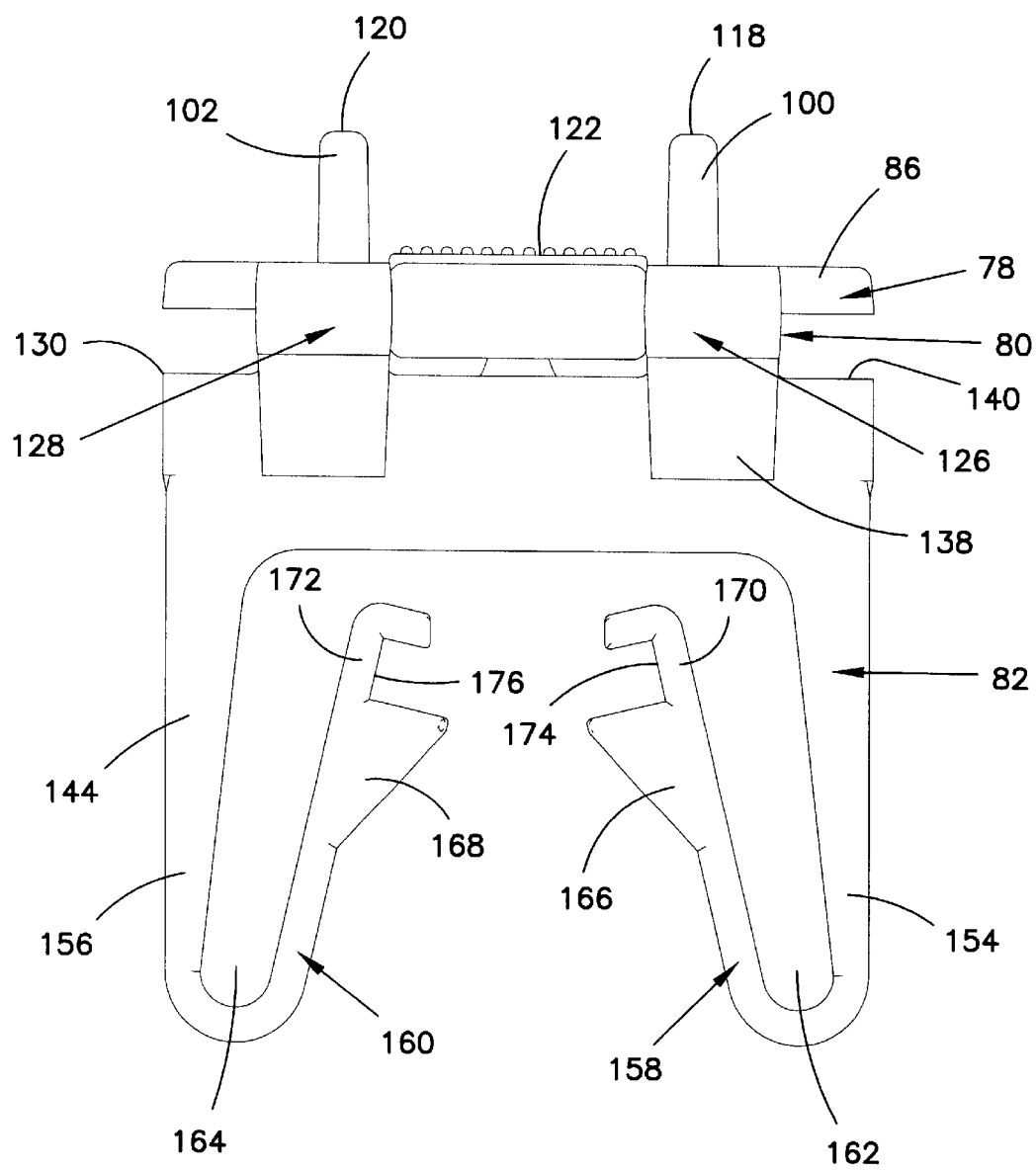
FIG. 16 is a rear view of the hinge clip of FIG. 14.

The hinge portion 78 also includes a spring member 98 having a pair of spring arms 100, 102. One end of each of the spring arms 100, 102 extends through the pair of holes 88, 90, respectively, from the bottom side 94 to the top side 92 of the plate 86. The other ends of the spring arms 100, 102 are bent toward each other. The bent ends are connected to each other and extend together toward the plate 86 on the bottom side 94 as shown in FIG. 15. The extended ends are mounted to a middle section 104 of the plate 86. The middle section 104 is preferably disposed on the axis 96 of the plate 86. The spring arms 100, 102 each includes a tab 106, 108, respectively, projecting in opposite directions from an exterior surface of 110, 112 of the spring arms 100, 102.

In use, the tabs 106, 108 of the spring arms 100, 102 are inserted into the hole 62 of the cover 60 from an inner side 114 of the cover 60 to an outer side 116 of the cover 60. To do so, the spring arms 100, 102 are pushed towards each other by the operator pressing on the extension surfaces 110, 112 proximate the first ends 118, 120 of the spring arms 100, 102, as indicated by arrows A—A in FIG. 15. The tabs 106, 108 are displaced inwardly away from their normal positions, as indicated by arrows B—B in FIG. 15, to allow the spring member 98 to be inserted into the hole 62 of the cover 60. Upon release of the spring arms 100, 102, the tabs 106, 108 are spring biased back to their normal positions to allow the spring member 98 to engage with the hole 62 of the cover 60. The cover 60 is then trapped between tabs 106, 108 and bottom side 94 of plate 86.

The two spring arms 100, 102, and the two holes 88, 90 are preferably symmetric about the axis 96 of the plate 86, respectively. Accordingly, the spring member 98 can be used to engage with the hole 62 on either the left side 64 or the right side 68 of the cover 60.

The hinge portion 78 includes an extension member 122 extending from a side 124 of the plate 86. The extension member 122 has a longitudinal bore to house a middle section of a hinge pin 81. Two ends of the hinge pin 81 are housed within two longitudinal bores of two support members 126, 128 of the hinge 80, respectively. The two support members 126, 128 are mounted on sides 130 of the clip portion 82 of the hinge clip 58.

Figure 17:
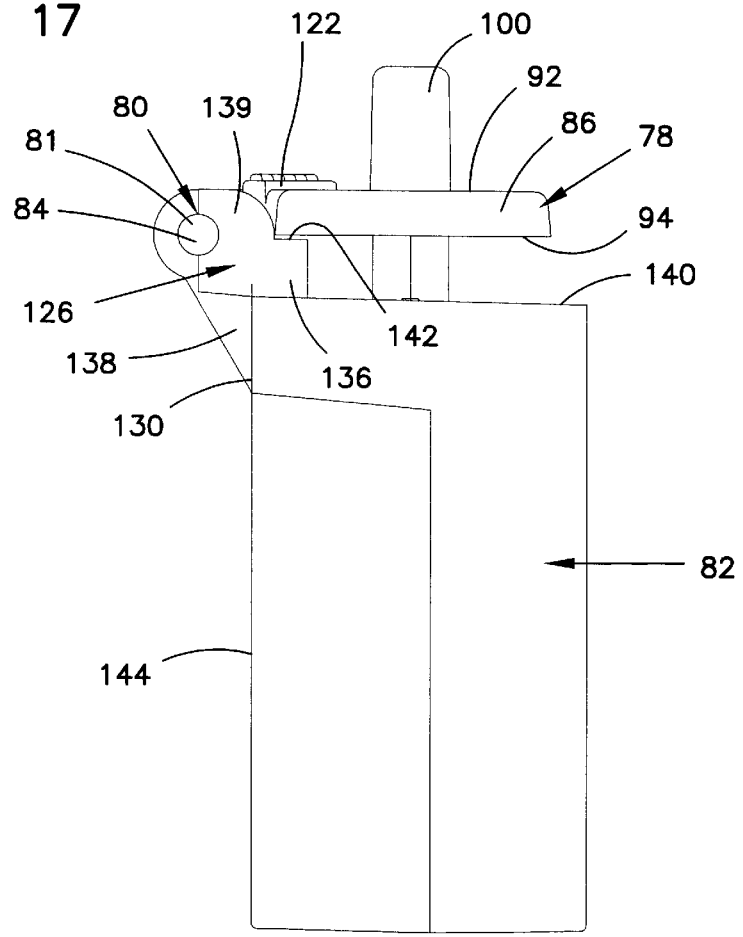
FIG. 17 is a left side view of the hinge clip of FIG. 14.
Figure 18:
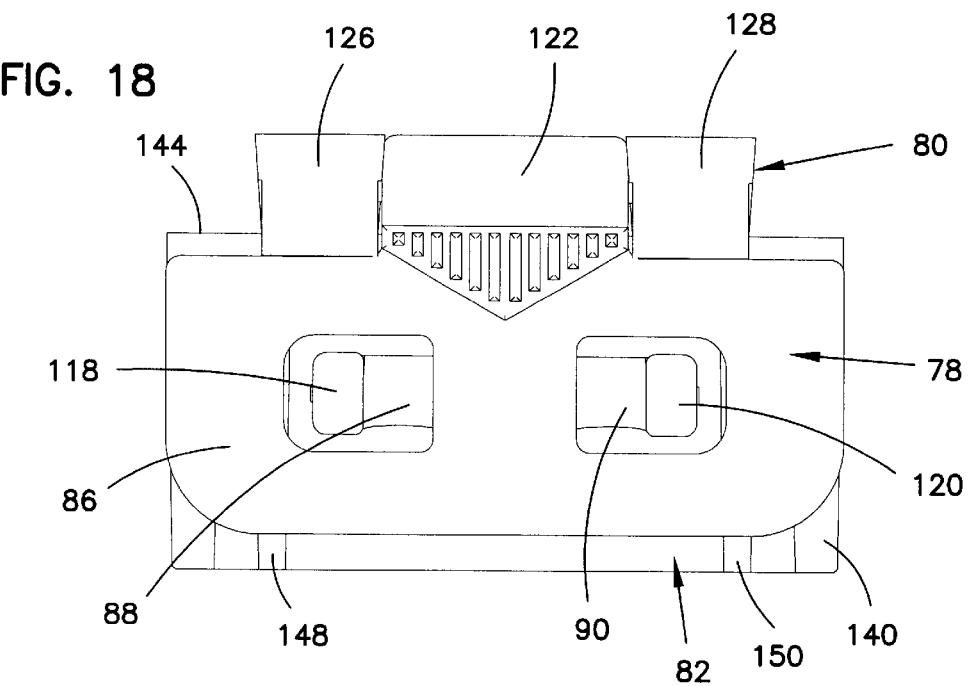
FIG. 18 is a top view of the hinge clip of FIG. 14.

As shown in FIG. 17, the member 126 includes an upper section 136, a lower section 138, and a middle section 139. The upper section 136 is integral to a top surface 140 of the clip portion 82. A shoulder 142 is formed between the upper section 136 and the middle section 139. When the plate 86 of the hinge portion 78 folds toward the clip portion 82, the plate 86 is positioned adjacent to the shoulder 142. When the plate 86 of the hinge portion 78 unfolds from the clip portion 82, the ends 118, 120 of the spring arms 100, 102 can be positioned adjacent to a back side 144 of the clip portion 82 if desired. Accordingly, the hinge portion 78 can pivot about the hinge 80 more than 180 degrees relative to the clip portion 82 in the illustrated embodiment.

At the top surface 140 of the clip portion 82, a recess 146 is formed to house the bent spring arms 100, 102 of the hinge portion 78 when the hinge portion 78 folds toward the clip portion 82. In the recess 146, two longitudinal members 148, 150 extend from a front side 152 of the clip portion 82 to the back side 144 of the clip portion 82. The longitudinal members 148, 150 are generally parallel to the axis 96 of the hinge portion 78 and symmetrically disposed on each side of an axis 149 parallel to the axis 96.

On the other side of the recess 146, a pair of legs 154, 156 are disposed underneath the recess 146. The legs 154, 156 extend outwardly away from each other. A pair of spring members 158, 160 are integral to the bottom ends of the legs 154, 156, which forms two U-shaped legs. The two U-shaped legs provide clearance 162, 164 for the spring members 158, 160 to be spring-biased away from each other as shown in the arrows C—C in FIGS. 14 and 15. The spring members 158, 160 include ramp sections 166, 168 and latch sections 170, 172. The two U-shaped legs extend from the front side 152 of the clip portion 82 to the back side 144 of the clip portion 82. The U-shaped legs are symmetrically disposed on each side of the axis 149 parallel to the axis 96.

In use, as shown in FIGS. 5–6, the clip portion 82 snaps onto a planar member, such as the bent section 54 of the rib 46. The rib 46, 48 of frame 20 is made from bent sheet metal. The bent section 54 of the rib 46 is pushed through the ramp sections 166, 168 of clip portion 82 which displace the spring members 158, 160 away from their normal positions. Once the bent section 54 reaches over the latch sections 170, 172, the bent section 54 falls into grooves 174, 176 of the latches 170, 172. The biased spring members 158, 160 trap the bent section 54 in the grooves 174, 176. Also, as shown, the clip portion 82 can be removed from the rib 46 by moving the clip portion 82 along the rib 46 towards the tab 52 at the distal end of the rib 46 and sliding off the clip portion 82 thereof Now referring back to FIG. 1, a pair of the hinge clips 58 are snap mounted onto the respective ribs 46 of the frame 20 by the clip portion 82 of the hinge clips 58. The hinge clips 58 are also inserted into the respective holes 62 of the covers 60. The top cover 60*a* is shown as pivotally opening the frame 20 from its right side 68, and the bottom cover 60*b* is shown as pivotally opening the frame 20 from its left side 64. The same hinge clips 58 can be used in either side of the frame 20 as the parts configured on the hinge clip 58 are symmetrical as described above.

To open a cover 60 of a structure from the left side of the frame 20 as shown, a user releases the hinge clips 58 at the first side 64 of the cover 60, pivotally opens the cover 60 along the second side 68 of the cover 60 about a pivot axis 71 defined by the hinge clips 58 of the second side 68 of the cover 60. If the user decides to open the cover 60 from the right side of the frame 20, the user releases the hinge clips 58 at the second side 68 of the cover 60. Then, the user pivotally opens the cover 60 along the first side 64 of the cover 60 about a pivot axis 67 defined by the hinge clips 58 at the first side 64 of the cover 60. The cover 60 can be opened in a radius more than 180 degrees, thus allowing the user to easily access the equipment or cables behind the cover 60 without removing the cover 60.

It is appreciated that the cover 60 can be entirely removed if desired by releasing the hinge clips 58 from both sides of the cover 60. It is also appreciated that the hinge clips 58 can be used in other sides of the frames or devices within the scope of the present invention. Other mounting structures for mounting the hinge clip 58 to the structure are possible including fasteners.

Having described the present invention in a preferred embodiment, modifications and equivalents may occur to one skilled in the art. It is intended that such modifications and equivalents shall be included within the scope of the claims which are appended hereto.

What is claimed is:

1. A hinge clip apparatus, comprising:
   a hinge portion, the hinge portion having a first spring section removeably engagable with a first structure;
   a hinge;
   a clip portion, the hinge portion pivotally moveable relative to the clip portion along the hinge which connects the hinge portion and the clip portion, the clip portion having a second spring section removeably engagable with a second structure; and
   wherein the first structure covers the second structure when the hinge portion engages the first structure, and the first structure uncovers the second structure when the hinge portion disengages from the first structure, and wherein the clip portion remains removeably engaged with the second structure when the first structure uncovers the second structure.

2. The apparatus of claim 1, wherein the first and second structures have a first side and a second side, the first structure is capable of pivoting open from the second structure at either the first side or the second side.

3. The apparatus of claim 1, wherein the first structure is a cover, and the second structure is a communications equipment frame.

4. The apparatus of claim 3, wherein the communications equipment frame includes a plurality of ribs, and the second spring section of the clip portion is removeably mounted onto a respective rib.

5. A hinge clip and cover apparatus for closing and opening a structure, comprising:
   a cover having a plurality of retaining holes;
   a plurality of hinge clips, each of the hinge clips having a hinge portion and a clip portion, the hinge portion being pivotally moveable relative to the clip portion along a hinge which connects the hinge portion and the clip portion, the hinge portion having a first spring section removeably retained in one of the retaining holes of the cover, the clip portion having a second spring section snap mountable to a planar member of the structure;
   wherein the cover closes the structure by mounting the clip portion of the hinge clips to the structure and engaging the first spring section of the hinge portion of the hinge clip with the respective retaining hole of the cover, and wherein the cover opens the structure by disengaging the first spring section of the hinge portion of the hinge clip from the respective retaining hole of the cover; and wherein a first of the hinge clips is mounted between the cover and the structure on one side of the cover to define a first pivot axis, and a second of the hinge clips is mounted between the cover and the structure on the other side of the cover to define a second pivot axis, such that the cover is capable of pivoting open to expose the structure about either of the first and second pivot axes when the hinge clip disposed at one side of the cover is disengaged from the cover, and the hinge clip disposed at the other side of the cover is engaged with the cover.

6. The apparatus of claim 5, wherein the structure is a communications equipment frame.

7. The apparatus of claim 6, wherein the communications equipment frame includes a plurality of ribs, and the second spring section of the clip portion is snap mountable onto a respective rib.

8. A hinge clip apparatus for selectively engaging/disengaging a cover, comprising:

a base including a clip portion to removeably engage a structure;

a hinge defining a hinge axis; and a plate, the plate pivotally moveable relative to the base along the hinge which connects the base to the plate, the plate including a hole and a spring member extending through the hole, the spring member having an extension tab capable of engaging the cover and disengaging from the cover when the spring member is compressed, and the clip portion of the base remaining removeably engaged with the structure when the cover is disengaged from the spring member.

9. The apparatus of claim 8, wherein the plate includes a pair of holes disposed at opposite sides of an axis, the axis being perpendicular to the hinge, the spring member having a pair of spring arms, one end of the spring arms extending through the pair of holes, respectively, and the other end of the spring arms being connected to each other.

10. The apparatus of claim 9, wherein the extension tab is disposed on each of the spring arms, wherein when the spring arms are compressed towards each other, the extension tabs move relatively towards each other so as to disengage the spring arms from the cover.

11. The apparatus of claim 10, wherein the pair of holes are disposed symmetrically along the hinge axis, and the pair of spring arms are disposed symmetrically along the hinge axis, such that the hinge clip apparatus is capable of being mounted on either side of the cover.

12. The apparatus of claim 11, wherein the cover has a slot, the extension tabs of the spring arms selectively engage the slot of the cover.

13. The apparatus of claim 8, wherein the base includes a clip for engaging opposite edges of a planar member.

14. A telecommunication cable management device, comprising:

a frame defining a vertical cable pathway;

a cover having first and second pairs of holes, the first pair of holes being disposed on a first side of the cover, and the second pair of holes being disposed on a second side of the cover; and first and second pairs of hinge clips, the first pair of hinge clips selectively engaging the first side of the cover with a first side of the frame, the second pair of hinge clips selectively engaging the second side of the cover with a second side of the frame, each of the hinge clips including:

a base mounted onto the frame;

a hinge defining a hinge axis; and a plate, the plate pivotally moveable relative to the base along the hinge which connects the base to the plate, the plate including a spring member, the spring member having an extension tab capable of engaging any one of the holes of the cover and disengaging from that hole of the cover when the spring member is compressed, wherein one of the first and second pairs of hinge clips is disengagable from the cover while engaged with the frame, and the other of the first and second pairs of hinge clips defines a pivot axis for the cover.

15. The device of claim 14, wherein the plate includes a pair of holes disposed at opposite sides of an axis, the axis being perpendicular to the hinge, the spring member having a pair of spring arms, one end of the spring arms extending through the pair of holes of the plate, respectively, and the other end of the spring arms being connected to each other.

16. The device of claim 15, wherein the extension tab is disposed on each of the spring arms, wherein when the spring arms are compressed towards each other, the extension tabs move relatively towards each other so as to disengage the spring arms from the cover.

17. The device of claim 16, wherein the pair of holes of the plate are disposed symmetrically along the hinge axis, and the pair of spring arms are disposed symmetrically along the hinge axis, such that the hinge clip apparatus is capable of being mounted on either side of the cover.

18. The device of claim 14, wherein the base includes a clip portion for engaging opposite edges of a planar member extending from the frame.

19. The device of claim 18, wherein the frame defines two sets of fingers extending from a base of the frame, wherein each set of fingers defines two of the planar members for being engaged by the clip portion of each hinge clip.

20. A method of closing and opening a cover of a structure, comprising the steps of:

providing first and second hinge clips, one hinge clip positioned on first and second opposite sides of the cover, respectively, each of the first and second hinge clips being attached to the structure and each defining a pivot axis;

releasing the first hinge clip from the first side of the cover while the first hinge clip remains removably attached to the structure; and pivoting open the cover of the structure along the second side of the cover about the pivot axis defined by the second hinge clip at the second side of the cover.

21. The method of claim 20, further comprising the steps of:

pivoting closed the cover of the structure along the second side of the cover;

locking the first hinge clip at the first side of the cover;

releasing the second hinge clip from the second side of the cover while the second hinge clip remains attached to the structure; and pivoting open the cover of the structure along the first side of the cover about the pivot axis defined by the first hinge clip at the first side of the cover.

* * * * *